Dec. 17, 1957 C. J. BOYER 2,816,290
PNEUMATIC SUSPENSION FOR SAFETY HAT
Filed Jan. 24, 1955 3 Sheets-Sheet 1
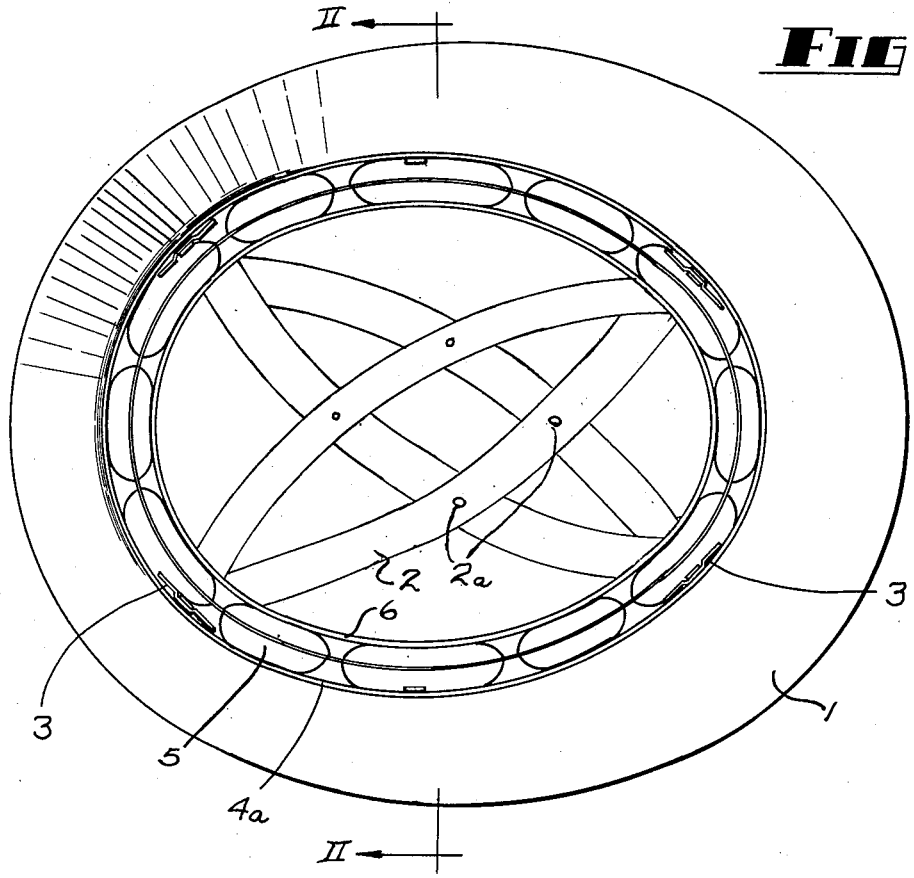
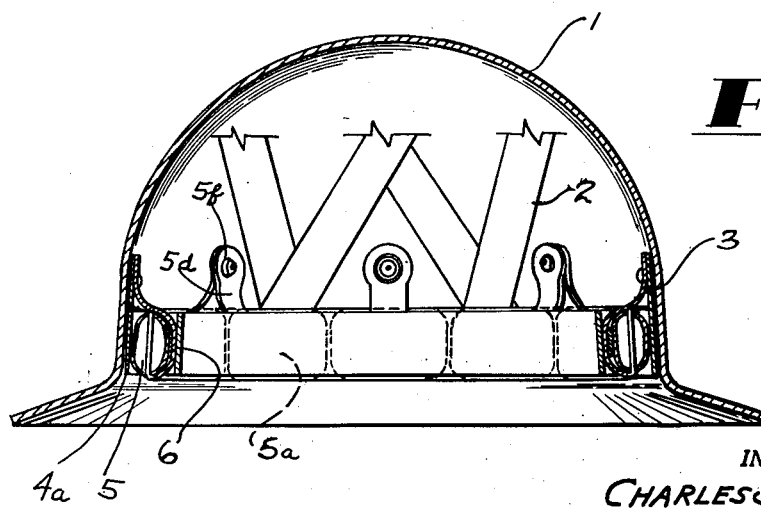
INVENTOR.
CHARLES J. BOYER
BY
*William J. Ruano*
ATTORNEY Dec. 17, 1957     C. J. BOYER     2,816,290
PNEUMATIC SUSPENSION FOR SAFETY HAT
Filed Jan. 24, 1955     3 Sheets-Sheet 2

INVENTOR.
CHARLES J. BOYER
BY
*William J. Ruano*
ATTORNEY

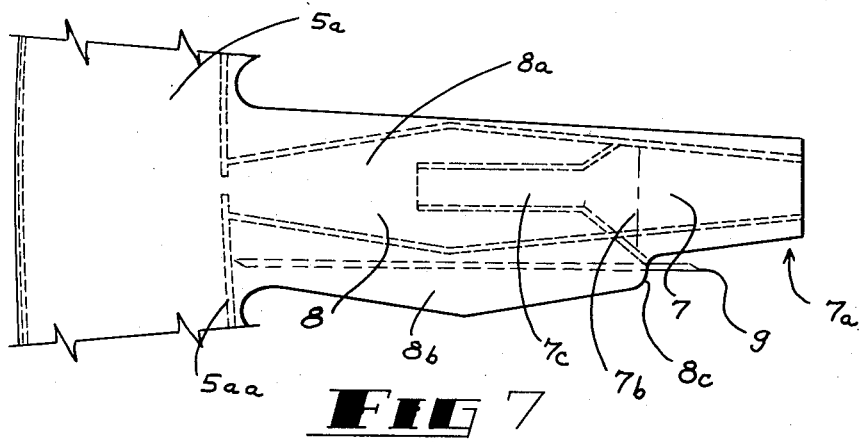
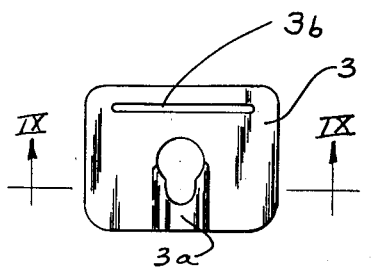
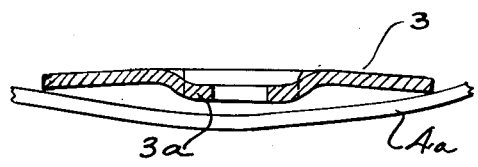
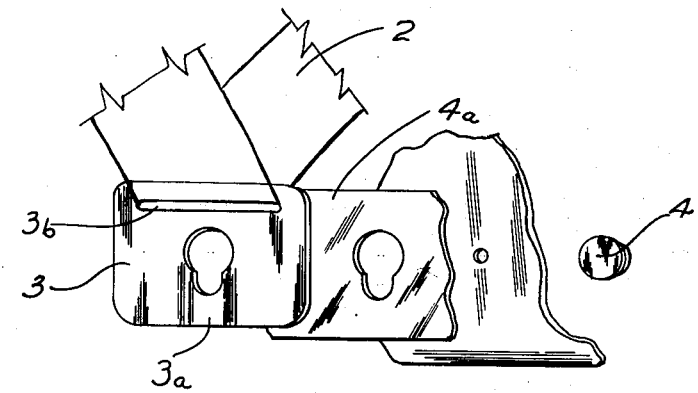

United States Patent Office 2,816,290
Patented Dec. 17, 1957

2,816,290

PNEUMATIC SUSPENSION FOR SAFETY HAT

Charles J. Boyer, Reading, Pa., assignor, by mesne assignments, to Ray-O-Vac Company, Madison, Wis., a corporation of Wisconsin Application January 24, 1955, Serial No. 483,673

9 Claims. (Cl. 2—3)

This invention relates to protective helmets and, more particularly, to a pneumatic suspension for a safety hat or helmet, such as worn by construction workers, miners and the like, to protect the head of the worker against injury from falling objects or as the result of collision with low ceilings and the like.

It is known in the art to provide, in a safety hat, an air cushioned or pneumatic suspension of plastic material in the form of a series of cells innerconnected by restricted passages to permit intercommunication among the cells to allow air to be forced through the passages as a consequence of a blow on the hat to dissipate the energy of impact.

An outstanding disadvantage of the above mentioned pneumatic suspension is that no suitable means have been found for securing the pneumatic cushion to the sweat band. Furthermore, such suspension necessitated two rows or bands of pneumatic pillows, one for horizontal blows and one for vertical blows, to effectively cushion the head against blows struck on the hat, which, of course, add to the cost of the assembly.

A still further disadvantage of the above mentioned pneumatic suspension is that the valve through which air is introduced into the air cells or cushions had a great tendency to leak and extreme difficulty was involved in maintaining an air tight seal in the valve. Also the band of pneumatic pillows was not readily detachable from the sweat band, nor was the suspension easily and quickly detachable from the hat, therefore parts were not readily replaceable. Moreover the cost of manufacture was relatively high.

An object of my invention is to provide a pneumatic suspension for a safety hat or helmet, which suspension is devoid of the above mentioned disadvantages of known suspensions and which may be in the form of a single pneumatic, cellular band to protect the wearer against horizontal, vertical and angular blows—also which is of relatively simple and inexpensive construction.

A further object of my invention is to provide a pneumatic suspension for a safety hat including an air inlet valve of such construction as to insure at all times an air tight seal after air is blown therethrough by the mouth or source of air pressure—also which valve may be readily opened to allow air to escape when it is desired to deflate the air cushions.

A still further object of my invention is to provide a simple pneumatic suspension for a safety hat, which suspension and its fastening means to the sweat band may be cut out from a single, double ply sheet or blank of plastic material.

A further object of my invention is to provide a safety hat suspension including readily detachable spring clips which provide secure, detachable anchoring means for the head band assembly and which are devoid of inward projections and are of exceedingly small thickness so as to provide practically no obstruction to the remainder of the suspension.

Other objects and advantages of my invention will become apparent from a study of the following description taken with the accompanying drawing wherein:

Figure 1 is a bottom view of a safety hat equipped with a pneumatic suspension embodying the principles of the present invention;

Figure 2 is a vertical, transverse, cross-sectional view taken along line II—II of Figure 1;

Figure 7 is an enlarged plan view showing the construction of the air inlet valve of Figure 3;

Figure 8 is an enlarged, plan view of one of the spring metal fastening clips shown in Figure 1;

Figure 9 is a cross-sectional view taken along line IX—IX of Figure 8; and

Figure 10 is an exploded view showing how the spring clips are fastened to the plastic band and safety hat.

Figure 3:
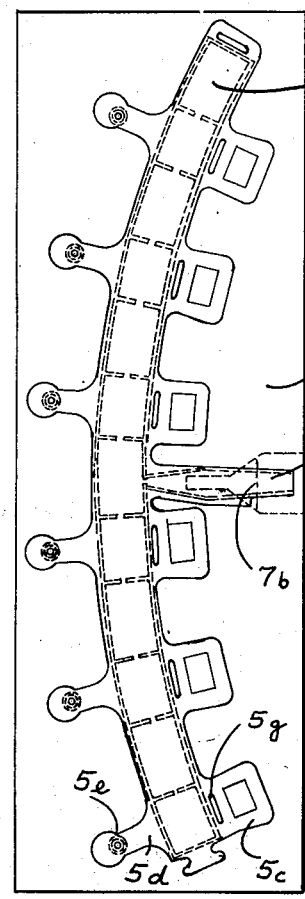
Figure 3 is a plan view of a double ply sheet of plastic material which is scored or perforated along the full lines indicated so that the entire pneumatic suspension band and attaching elements for mounting on the sweat band and hat may be formed from the same sheet.

Referring more particularly to Figures 1 and 2 of the drawing, numeral 1 denotes a safety helmet or hat made of any suitable material, such as plastic reinforced with random oriented glass fibers. A crown suspension 2 is made up of a plurality of fabric strips which are secured to each other at intersecting points by suitable fastening elements, such as rivets 2a, so as to maintain the arrangement shown on the drawing, which arrangement avoids radially extending strips from a central point, and thus which effectively cushions the head against minor blows irrespective of the angle at which the blows are struck on the hat. The extreme or outermost portions of the crown strap assembly 2 are in the form of loops extending through slots 3b of metal clips 3, as shown more clearly in Figures 8–9–10, which clips are preferably curved.

The metal clips 3 are each provided with a keyhole slot, the lower portion of which is pressed or bulged out at 3a to provide a yieldable, spring grip with the head portion of rivets 4. It will be understood that there are four clips, such as shown in Figures 8–9, disposed at the four outermost looped portions of crown suspension 2, each of which is fastened to a rivet 4 fastened to the hat and having an inwardly projecting head portion. Actually there are a larger number of rivets 4 than clips disposed above the brim portion of the hat to more securely support the sweatband. A perforated plastic band 4a is fastened against the inner surface of the hat and having a plurality of uniformly spaced keyhole shaped holes adapted to register with those shown in clips 3, and through which holes the inwardly projecting head portions of rivets 4 are adapted to pass, so as to support the plastic strip 4a at a plurality of circumferential shaped points along the interior of the hat. Thus after the plastic band 4a is held in place and supported by the rivets 4, the central protruding portions 3a of clips 3 are pressed against the band in a downward direction as viewed in Fig. 9 with their keyhole slots in registry with those in strips 4a so as to deform projection 3a as the clips 3 are moved upwardly in engagement with rivets 4 while the portions of reduced width of the keyhole slots encircle the shank portions of the rivets 4. Thus there is provided a very tight and yieldable connection between the spring clips 3 and rivets 4. The construction of clip 3 allows the inner head portions of rivets 4 to project inwardly only a slight amount and thus not provide dangerous obstructions which might be engageable with the wearer's head as the result of severe blows—also providing more clearance to provide a compact headband assembly.

Another important feature of the present invention resides in the construction of the air cushioning or pneumatic band 5 which is formed of flexible material, preferably polyvinyl or other suitable plastic material which may be bonded together by the application of heat and pressure along a certain path so as to provide a series of air pillows or cushions 5a which are innerconnected by intercommunicating restricted passages 5b through which air may pass from one pillow to the next and so on as the result of impact on the hat.

Figure 3 shows how the air cushioning band 5 and its fastening elements may be integrally formed from a pair of overlapping plastic sheets 8 which are scored along the full lines shown and heat sealed along the dotted outline. Also integrally formed are a plurality of frame portions 5c which extend outwardly from spaced points along one margin of unit 5, and a plurality of corresponding fastening strip elements 5d which extend oppositely thereof from the opposite margin.

Figure 4:
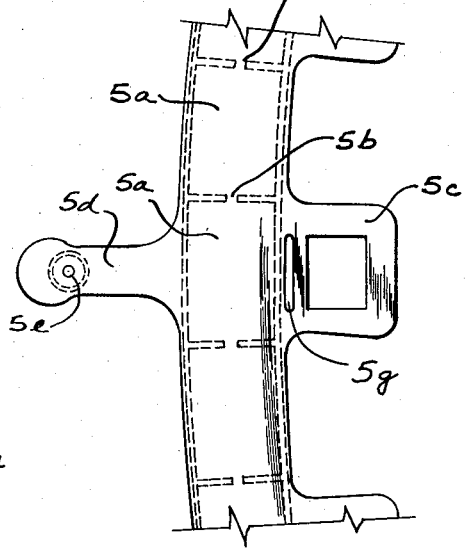
Figure 4 is an enlarged, fragmentary plan view of a portion of the pneumatic suspension band after being cut out from the double sheet shown in Figure 3.

The sweat band 6, of leather or other suitable material, is provided with a plurality of circumerentially spaced pairs of horizontally extending slots 6a which are spaced apart at substantially the same distance as the width of the frame portion 5c along a horizontal direction as shown in Figure 4.

Figure 6:
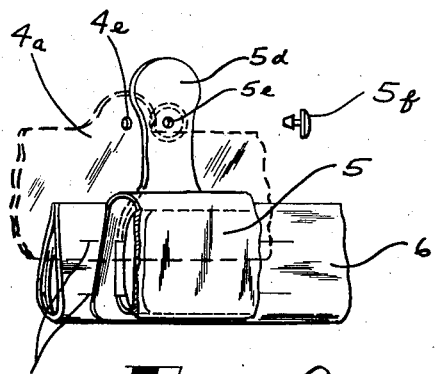
Figure 6 is a fragmentary, somewhat exploded, view of a portion of the pneumatic headband suspension, showing the manner in which the fastening means of the pneumatic band are attached or laced to the sweatband.

In order to attach the pneumatic unit 5 to the sweat band 6, the various frame portions 5c are first folded over onto portions 5a, with the slitted parts 5g as pivots, and then the pneumatic band 5 is made endless by attaching its ends together and is placed against the sweat band with the margins of the frame portions in substantial coincidence with the slits 6a of the sweat band. Strips 5d are then passed through the opening in frame portion 5c and inserted in the lower slit 6a, through the interior of the sweat band 6 and outwardly through the upper slit 6a of the sweat band, and finally through slit 5g so as to become looped and attached to the sweat band. Thus the end portions of strips 5d will extend upwardly as shown in Figure 6 so that holes 5e therein may be placed in registry with corresponding holes 4e in the plastic strip 4a which lies against band 5.

Finally suitable fastening means, such as small rubber or plastic elastic rivets 5f are used to attach strips 5d to the plastic ring by inserting the shank portions of the rivets through the registering holes 5e and 4e.

Thus the sweat band 6, pneumatic suspension band 5, and plastic band 4a are attached to and suspended from the interior of the hat and thus form a readily detachable assembly permitting quick and easy replacement of any of these parts. For example, if either the sweat band 6 or the pneumatic band 5 should require replacement then by merely detaching rivets 5f and unlooping frame portions 5c and strip portions 5d from the sweat band either part may be readily detached from the other and replaced.

Figure 5:
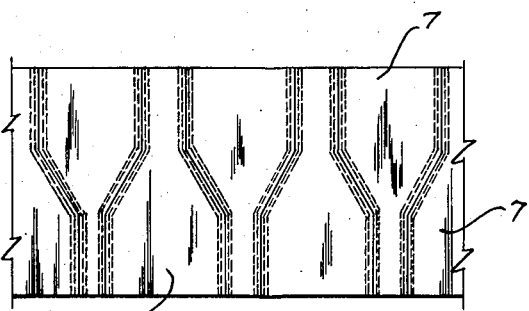
Figure 5 shows how a plurality of valve stems are made from a single, two ply sheet of plastic material.

Another important feature of the present invention is the construction of the air inlet valve 7a shown more clearly in Figure 7 and the method of making such valve so as to avoid the possibility of air leaks through the outer marginal edge. In making such valve, a pair of plastic strips are superimposed and heat sealed together along the dotted lines shown in Figure 5 and scored along the full lines shown so as to form a plurality of funnel-like elements 7. These funnel-like elements 7 may be readily separated by tearing along the scored (full) lines shown. Each funnel-like element therefore comprises two superposed pieces of plastic material sealed together only along their outer marginal edges with the exception of the top and bottom ends which provide funnel openings.

One of such funnel-like elements 7 is employed in making the air inlet valve 7a by sandwiching it between the two plastic sheets 8, as shown in Figure 3, as shown in dotted lines. Each of the sheets 8 is then heat sealed and adhered throughout the entire area extending outwardly from line 7b and bounded by the outer margins of funnel-like element 7. But the stem portion of the funnel-like element 7 extends between sheets 8 and is unattached thereto. The stem assembly is then cut out along the scored or full lines shown in Figure 3 so that the final assembly will apper as shown more clearly in Figure 7. Thus the funnel-like element 7 provides an air inlet opening having walls of the thickness of sheet 8 added to the thickness of one of the sheets forming the funnel-like member 7.

In order to permit separation of the opposite thickened walls of funnel-like elements 7 a probe in the form of a match stick or quill may be projected through the mouth or inlet opening of the funnel-like element and continued through the stem portion so as to separate the two opposite walls thereof to allow air to be freely introduced or blown through the stem and into passage 8a which intercommunicates with cell units 5a. Air may be either blown in by mouth or a source of compressed air.

After a sufficient amount of air is introduced to fill the air cellular units to the desired pressure, the probe is removed so that the walls of the funnel-like element 7 may be brought together. The internal air pressure, such as in passage 8a, will press the walls of stem portion 7c tightly together to provide a self-closing valve and thus prevent outward escape of air. In view of the large double walled, sealed area of funnel-like element 7, air cannot escape through the outer marginal portions thereof as in prior devices. Thus if a leak should develop along the outer marginal portion of funnel-like element 7 it will have no effect as far as the internal air pressure is concerned.

When the wearer desires to deflate the pneumatic or air cushioned band 5 to reduce the air pressure therein, he will again insert a probe through the inlet opening and between the thickened walls of funnel-like element 7 to counteract the tendency of the internal pressure to collapse or tightly hold together the walls of the latter. Thus, regulatable amounts of air may be introduced in the pneumatic assembly. Stem 7a may be made sufficiently long so that the wearer may put the end in his mouth and blow air into the pneumatic band 5 while it is being worn on the head and until sufficient air is introduced into band 5 to provide a perfect fit with the head of the wearer.

As shown more clearly in Figure 7, a side pocket portion 8b is provided by sealing the marginal side edges thereof with the exception of inlet 8c through which a probe 9 may be inserted and extended as far as the sealed marginal edge 5aa. The probe 9 may be in the form of a plastic tube of very small diameter with its end portions cut at an angle to provide a sharp probing point. Thus the side pocket or pouch portion 8b provides a convenient receptacle for holding the probe 9 at all times so as to make it readily and quickly available when needed to probe an opening through funnel-like element 7. The entire air inlet valve assembly shown in Figure 7 will project upwardly inside the hat, close to the inner wall surface of the crown portion so as not to interfere with the head of the wearer.

Thus it will be seen that I have provided an efficient air cushioned head band assembly which includes a cushioned pneumatic band formed of cellular or pillow-like units filled with air, which band is provided with integral, laterally projecting fastening elements for looping through slots in the sweat band so as to make the pneumatic band readily attachable to an detachable from the sweat band to permit ready replacement of either the sweat band or the pneumatic band; furthermore I have provided novel clips having offset central portions immediately below keyholes therein to permit a tight yieldable connection with the heads of inwardly extending rivets disposed along the inner periphery of the hat providing minimum inward extension towards the head and thus maximum clearance, as well as to provide a secure and fast but nevertheless readily detachable connection between the crown strap and hat; furthermore I have provided an air inlet valve for the pneumatic or cushioned head band suspension which provides a very large sealed wall area along the outer marginal portions thereof to prevent air leakage as a consequence of fraying of the outer marginal edges of the valve; also I have provided an integral side pouch in the air inlet valve stem for allowing storage of the probe to make it readily handy and available when it becomes necessary to spread apart the collapsed side walls of the air inlet funnel-like element.

While I have illustrated and described one embodiment of my invention, it will be understood that this is by way of illustration only, and that various changes and modifications may be made within the contemplation of my invention and within the scope of the following claims.

I claim:

1. A safety hat comprising a crown strap suspension having a plurality of clips secured to spaced loops along the outer perimeter thereof, each of said clips being bowed perimetrically and away from the inner surface of the hat and including a keyhole slot and a central, vertical, pressed out portion extending toward the hat and providing a lateral offset forming an extension only of the narrow opening of the keyhole, said hat including a plurality of inwardly extending rivets attached along the perimeter of the crown portion of the hat and having inwardly extending heads which fit through the larger openings of the keyhole slots with the shank portion of said rivets being adapted to slide into the narrow openings of the keyhole slots and at the same time the bottom surface of the rivet heads pressing against the offset area of said clip to spring the clip and form a tight connection without projection of said heads beyond said clips.

2. A safety hat comprising a crown strap suspension including a plurality of clips attached to spaced loops along the perimeter of said suspension for detachable connection with fastening elements projecting from the interior of the hat, a pneumatic suspension band of resilient plastic material having a series of closed, interconnected air cells for providing a plurality of inflatable, pneumatic air cushions along the brow portion of the hat to cushion the wearer's head against shocks, said band including spaced, integral lateral extensions projecting from a margin thereof, a sweat band having a plurality of vertically spaced horizontal slits, said extensions being looped through said slits so as to attach the pneumatic suspension band to the sweat band and attached to the interior of said hat.

3. In a safety hat having a sweat band, an air cushioned head band comprising a pair of plastic strips adhered along marginal edge portions and partially along spaced transverse portions in a manner so as to form a series of inflatable pneumatic air pillows interconnected by narrow central passages for absorbing the energy of blows struck against the hat, said band extending along the inner periphery of said hat alongside said sweat band having a plurality of pairs of integral lateral projections extending oppositely from the marginal edges thereof at spaced points and looped together, certain of said projections being looped through vertically spaced horizontal slits formed in the sweat band for attaching said air cushioned head band and sweat band together in a readily detachable manner.

4. In a safety helmet, a head band suspension including a sweat band having vertically spaced, horizontal slots and an annular band of soft plastic material formed of two strips adhered along their marginal outer edges and along spaced transverse portions exclusive of central portions so as to provide a series of intercommunicating inflatable, pneumatic air cells, integral extensions extending in opposite directions at spaced intervals along said band, the extensions emerging from one marginal edge of the band being in the form of rectangular frames having slits adjacent the marginal edge, and the extensions emerging from the other marginal edge being directly oppositely and in the form of strips having perforated end portions, said strips being looped through said horizontal slits in said sweat band and through said frame projections so as to detachably secure the head band and sweat band together.

5. A safety hat as recited in claim 3 wherein said head band includes an air inlet check valve in the form of a tubular extension formed of two superposed sheets sealed together along marginal edges and having sandwiched therebetween a funnel-shaped, flattened tubular plastic air inlet valve having its outer walls heat sealed along a substantial area to the inner walls of said tubular extension.

6. A safety hat as recited in claim 5 wherein said air inlet check valve has a lateral integral extension in the form of a pouch heat sealed along the marginal edges and open only at the outermost edge away from the pneumatic band, and having mounted therein an elongated probing element which is adapted to pierce an opening through said air inlet valve.

7. A safety helmet as recited in claim 4 together with a band of plastic material extending alongside said sweat band and having circumferentially spaced perforations, a plurality of rivets attached at spaced points about the perimeter of said hat immediately above the visor portion thereof and having inwardly extending heads which pass through perforations in said last mentioned band for attaching it to the hat, resilient rivets passing through said perforations in the end portions of said strips and through other perforations at the top portion of said band of plastic material.

8. A pneumatic air cushioning band for attachment to a slitted sweat band of a safety hat to cushion the head of the wearer against shocks comprising a pair of superposed flexible plastic sheets heat sealed together along marginal portions and along spaced transverse portions with the exception of central portions of the latter so as to form a plurality of air cushioning pneumatic pillows having restricted air passages therebetween for absorbing shocks resulting from blows on the hat, and having, at spaced points thereof, lateral extensions emerging from opposite marginal edges of said band, the extensions emerging from one marginal edge of the band being in the form of rectangular frames each having a slit adjacent the marginal edge, the extensions emerging from the opposite marginal edge of said band being directly oppositely in the form of strips having perforated outer tabs, whereby said strips may be looped through the frame portions and through said slits of the sweat band in order to attach the air cushioning band to the sweat band, and whereby said perforated tabs may be attached to a liner inside said hat.

9. A safety hat having a plurality of studs having heads projecting radially inwardly of the crown portion and comprising a crown strap suspension having a plurality of clips secured to spaced loops along the outer perimeter thereof, each of said clips including a keyhole slot and a central, vertical, pressed out well portion providing a lateral offset forming an extension only of the narrow opening of the keyhole and projecting toward the hat, the end portions of said clips being curved oppositely to the curvature of said hat along its perimeter and having side edges adapted to be supported against the inner surface of the hat and thus provide a yieldable support therewith, whereby said pressed out well portion will be yieldingly supported in spaced relationship with the inner surface of the hat and whereby said heads will be recessed within said well portion.

References Cited in the file of this patent

UNITED STATES PATENTS

| | | |
|---|---|---|
| 365,577 | Campbell | June 28, 1887 |
| 562,817 | Frick et al. | June 30, 1896 |
| 2,025,772 | Punton | Dec. 31, 1935 |
| 2,028,060 | Gilbert | Jan. 14, 1936 |
| 2,398,561 | Ruggiero | Apr. 16, 1946 |
| 2,415,214 | Lewis | Feb. 4, 1947 |
| 2,585,937 | Johnson et al. | Feb. 19, 1952 |
| 2,597,367 | Nyman | May 20, 1952 |
| 2,597,924 | Davenport et al. | May 27, 1952 |
| 2,679,046 | Dye | May 25, 1954 |

FOREIGN PATENTS

| | | |
|---|---|---|
| 375,391 | Italy | Oct. 6, 1939 |